US007619381B2

(12) United States Patent
Kawai et al.

(10) Patent No.: US 7,619,381 B2

(45) Date of Patent: Nov. 17, 2009

(54) OPEN/CLOSE MEMBER CONTROL APPARATUS

(75) Inventors: Nobuyuki Kawai, Okazaki (JP); Yutaka Fujiwara, Okazaki (JP); Yoichi Sakuma, Nagoya (JP); Noboru Ujigawa, Kasugai (JP)

(73) Assignees: Mitsubishi Jidosha Kogyo Kabushiki Kaisha, Tokyo (JP); Omiron Corporation, Kyoto (JP)

( * ) Notice: Subject to any disclaimer, the term of this patent is extended or adjusted under 35 U.S.C. 154(b) by 345 days.

(21) Appl. No.: 11/882,334

(22) Filed: Jul. 31, 2007

(65) Prior Publication Data

US 2008/0036406 A1 Feb. 14, 2008

(30) Foreign Application Priority Data

Aug. 1, 2006 (JP) ............................ 2006-210094

(51) Int. Cl.

*H02P 1/00* (2006.01)
*H02P 3/00* (2006.01)
*H02P 5/00* (2006.01)
*H02P 7/00* (2006.01)

(52) U.S. Cl. ........................ 318/283; 318/282; 318/286

(58) Field of Classification Search ................. 318/283, 318/282, 286

See application file for complete search history.

(56) References Cited

U.S. PATENT DOCUMENTS

| | | | | |
|---|---|---|---|---|
| 7,073,291 | B2 * | 7/2006 | Kawanobe et al. | 49/26 |
| 2004/0189046 | A1 * | 9/2004 | Kawanobe et al. | 296/155 |
| 2006/0290309 | A1 * | 12/2006 | Saitou et al. | 318/469 |
| 2007/0052293 | A1 * | 3/2007 | Shibata et al. | 307/10.1 |

FOREIGN PATENT DOCUMENTS

| | | | |
|---|---|---|---|
| EP | 1 158 129 | A2 | 11/2001 |
| JP | 61-64983 | A | 4/1986 |
| JP | 3157011 | B2 | 2/2001 |
| JP | 2001-118465 | A | 4/2001 |
| JP | 3578568 | B2 | 7/2004 |

* cited by examiner

*Primary Examiner*—Bentsu Ro
*Assistant Examiner*—Erick Glass
(74) *Attorney, Agent, or Firm*—Birch, Stewart, Kolasch & Birch, LLP

(57) ABSTRACT

The present invention provides an open/close member control apparatus capable of blocking entry of a ruffian even if forced closing operation is cancelled during closing operation of an open/close member by the forced closing operation and suppressing damage on an object which is erroneously caught. In the open/close member control apparatus for switching closing operation of a window to opening operation in the case where pinch of a foreign matter is detected and the forced closing operation of the switch is not maintained and continuing the closing operation of the window in the case where pinch of a foreign matter is detected and the forced closing operation of the switch is maintained, in the case where pinch is detected and the forced closing operation of the switch is maintained, when the maintenance of the forced closing operation is cancelled during closing operation of the window, the window opening operation is performed so that an open amount of the window becomes smaller than that in normal times.

2 Claims, 10 Drawing Sheets

OPEN/CLOSE MEMBER CONTROL APPARATUS

BACKGROUND OF THE INVENTION

1. Field of the Invention

The present invention relates to an open/close member control apparatus for opening/closing an open/close member such as a window in a vehicle.

2. Background Art

A window opening/closing control apparatus (hereinbelow, called "power window apparatus") mounted on a vehicle is an apparatus for opening/closing a window by vertically moving a window glass in a door by rotating a motor forward or reverse in accordance with an operation of a switch. There is a power window apparatus having a manual mode of manually opening/closing a window and an automatic mode of automatically opening/closing a window. Japanese Unexamined Patent Application Publication No. 2001-118465 discloses an operation switch for a power window apparatus capable of switching five operation modes of a manual closing mode, an automatic closing mode, a manual opening mode, an automatic opening mode, and a neutral (stop) mode.

Generally, in the manual mode, a window closing or opening operation is performed only for the period of time in which an operation knob of a switch is manually held in the position of the manual closing mode or the manual opening mode. When the user moves his/her hand off the operation knob and the knob returns to the neutral position, the window closing or opening operation stops. On the other hand, in the automatic mode, once the operation knob is operated to the position of the automatic closing mode or the automatic opening mode, even when the user moves his/her hand off the operation knob and the knob returns to the neutral position, the window closing operation or the window opening operation continues.

In such a power window apparatus, in the case where an object or a human body is caught in the clearance of the window glass during the window closing operation, it is detected and the window closing operation is switched to the opening operation, thereby preventing the object or human body from being damaged and assuring safety. In particular, in the case of closing the window by the automatic closing operation, if there is no pinch detecting function, the window is continuously closed even after occurrence of a pinch. Consequently, from the viewpoint of avoiding danger, the pinch detecting function is indispensable.

When pinch occurs, the load on the motor for vertically moving the window glass upward increases and the rotation speed decreases, so that a change amount of the rotation speed of the motor increases. Therefore, the change amount of the rotation speed of the motor is compared with a predetermined threshold. When the amount of change does not exceed the threshold, it is determined that no pinch has occurred. When the amount of change exceeds the threshold, it is determined that pinch has occurred. In such a manner, whether pinch has occurred or not can be detected. Alternatively, by using the amount of change in current flowing in the motor in place of the amount of change in the rotation speed of the motor, whether pinch has occurred or not can be detected.

However, for example, when the window glass is frozen in winter and, due to this, the load on the motor increases in the window closing operation, although a foreign matter is not caught in the window, there is the possibility that occurrence of pinch is erroneously determined and the window is opened. As a countermeasure against the problem, Japanese Patent No. 3,157,011 discloses a technique that after occurrence of pinch is determined and a window is switched to the opening operation or stop, when a switch is operated to close the window, the window is forcedly closed. Japanese Unexamined Patent Application Publication No. S61-64983 discloses that, in the case where occurrence of pinch is determined, when it is detected that a switching operation of closing a window is performed a predetermined number of times, the window is forcedly closed. Further, Japanese Patent No. 3,578,568 discloses a technique of forcedly closing a window in the case where pinch of a foreign matter is determined a predetermined number of times in a row.

As described above, the power window apparatus can prevent an object or human body caught in a window from being damaged by providing the pinch detecting function. On the other hand, due to the existence of the pinch detecting function, the following problems arise.

For example, if a ruffian tries to enter a vehicle compartment from a window which is being closed in automatic closing operation, there is a case such that the closing window touches the body of the ruffian and occurrence of pinch is determined. The closing operation of the window is then switched to the opening operation, and the window is open. When the window is open, the ruffian can easily enter the compartment, and the driver may be harmed. Consequently, to prevent a ruffian from easily entering the compartment, it is performed that the window is not open even if pinch is detected in the case where the switch is operated to an automatic closing mode to close the window automatically and, after that, the switch is maintained in the automatic closing mode.

However, there is a case such that while the switch is maintained in the automatic closing mode against entry of a ruffian, the driver moves his/her hand off from the switch by mistake and the forced closing operation is cancelled. In this case, the switch is reset to a normal automatic closing mode. Hence, when pinch is detected, the window is open, and a ruffian can easily enter the compartment. There is another method of not opening the window but stopping the window when pinch is detected. In this case, however, although entry of a ruffian is suppressed, if an object is erroneously caught, the object remains caught. Therefore, if a pinch load is heavy, the object may be damaged.

SUMMARY OF THE INVENTION

An object of the present invention is to provide an open/close member control apparatus capable of blocking entry of a ruffian even if forced closing operation is cancelled during closing operation of an open/close member by the forced closing operation and suppressing damage on an object which is erroneously caught.

According to the first aspect of the invention, there is provided an open/close member control apparatus comprising: a switch for opening/closing an open/close member; a load detector that detects load on the open/close member; and a pinch detector for detecting pinch of a foreign matter in the open/close member on the basis of the load detected by the load detector, the apparatus having a function of forcedly making the open/close member perform closing operation even if pinch is detected by performing a predetermined forced closing operation on the switch, and switching the closing operation of the open/close member to opening operation in the case where the pinch detector detects pinch and the forced closing operation on the switch is not maintained, and continuing the closing operation of the open/close member in the case where the pinch detector detects pinch and the forced closing operation on the switch is maintained, wherein in the case where the pinch detector detects pinch and the forced closing operation of the switch is maintained, when the maintenance of the forced closing operation is cancelled during closing operation of the open/close member, the open/close member is allowed to perform opening operation so that an open amount of the open/close member becomes smaller than that in normal times.

In the first aspect of the invention, even if the maintenance of the forced closing operation is cancelled during the closing operation of the open/close member by the forced closing operation on the switch and the open/close member is open due to detection of pinch, the open amount of the open/close member is smaller than that in normal times. Consequently, entry of a ruffian from the open/close member such as a window is suppressed, and a person on the inside can be prevented from being harmed. In the case where an object is caught by mistake, the open/close member is open without stopping. Consequently, the pinch load is reduced, and the caught object can be prevented from being damaged.

According to the second aspect of the invention, there is provided an open/close member control apparatus comprising: a switch for opening/closing an open/close member; a load detector that detects load on the open/close member; and a pinch detector for detecting pinch of a foreign matter in the open/close member on the basis of the load detected by the load detector, the apparatus having a function of forcedly making the open/close member perform closing operation even if pinch is detected by performing a predetermined forced closing operation on the switch, and switching the closing operation of the open/close member to opening operation in the case where the pinch detector detects pinch and the forced closing operation on the switch is not maintained, and continuing the closing operation of the open/close member in the case where the pinch detector detects pinch and the forced closing operation on the switch is maintained, wherein in the case where the pinch detector detects pinch and the forced closing operation of the switch is maintained, when the maintenance of the forced closing operation is cancelled during closing operation of the open/close member, the open/close member is allowed to perform opening operation so that open speed of the open/close member becomes lower than that in normal times.

In the second aspect of the invention, even if the maintenance of the forced closing operation is cancelled during the closing operation of the open/close member by the forced closing operation on the switch and the open/close member is open due to detection of pinch, the open speed of the open/close member is lower than that in normal times, and the open/close member opens slowly. Consequently, entry of a ruffian from the open/close member such as a window is suppressed, and a person on the inside can be prevented from being harmed. In the case where an object is caught by mistake, the open/close member is open without stopping. Consequently, the pinch load is reduced, and the caught object can be prevented from being damaged.

According to the present invention, even if maintenance of the forced closing operation is cancelled and the open/close member is open, the open amount or open speed of the open/close member is smaller/lower than that in normal times. Consequently, entry of a ruffian to the inside can be blocked. In the case where an object is caught, the open/close member opens without stopping, so that damaging of the object caught is suppressed.

DETAILED DESCRIPTION OF PREFERRED EMBODIMENTS OF THE INVENTION

Figure 1:
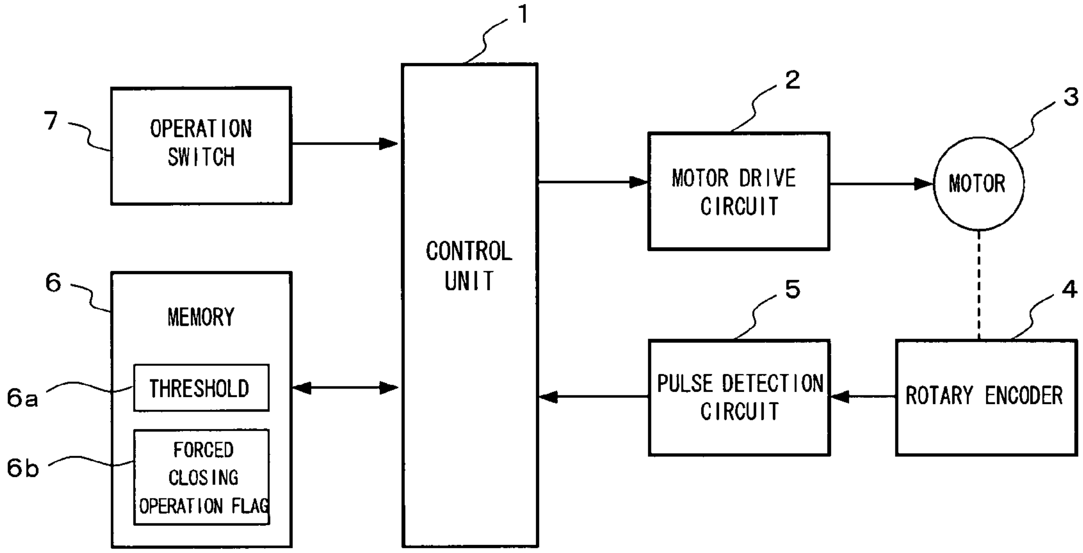
FIG. 1 is a block diagram showing an electric configuration of a power window apparatus of the present invention.

FIG. 1 is a block diagram showing an electric configuration of a power window apparatus as an embodiment of the present invention. Reference numeral 1 denotes a control unit made by a CPU for controlling a window opening/closing operation, 2 denotes a motor drive circuit for driving a motor 3, 4 indicates a rotary encoder for outputting a pulse synchronized with rotation of the motor 3, 5 indicates a pulse detection circuit for detecting a pulse output from the rotary encoder 4, 6 indicates a memory such as a ROM and a RAM, and 7 denotes an operation switch for operating opening/closing of a window. The memory 6 has an area 6*a* in which a threshold for determining pinch is set and an area 6*b* in which a forced closing operation flag to be described later is stored. The rotary encoder 4 and the pulse detection circuit 5 together with the control unit 1 correspond to an embodiment of load detector in the present invention. The control unit 1 corresponds to an embodiment of pinch detector in the present invention.

In FIG. 1, when the operation switch 7 is operated, a window opening/closing instruction is given to the control unit 1, and the motor 3 is rotated forward or reverse by the motor drive circuit 2. By the rotation of the motor 3, a window opening/closing mechanism (which will be described later) interlocked with the motor 3 operates to open/close a window 100. The pulse detection circuit 5 detects a pulse output from the rotary encoder 4. On the basis of the detection result, the control unit 1 calculates an open/close amount of the window 100 and the rotation speed of the motor 3 and controls the rotation of the motor 3 via the motor drive circuit 2.

Figure 2:
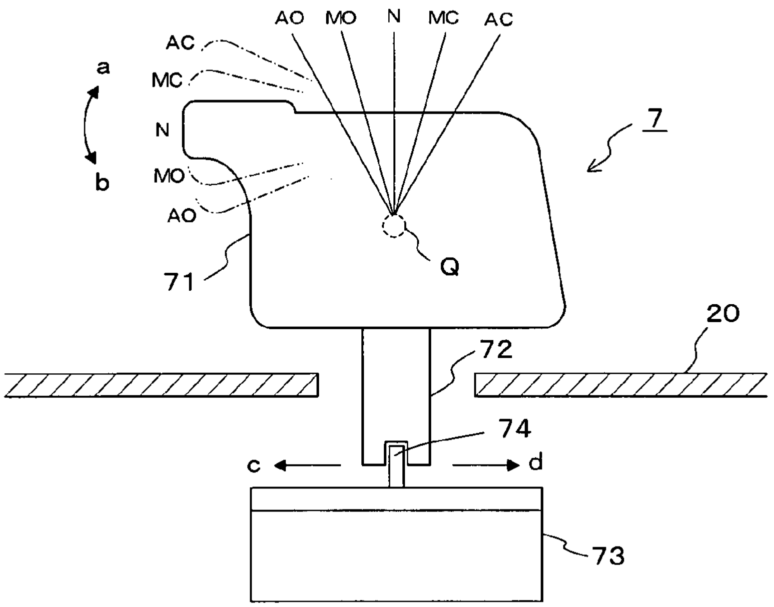
FIG. 2 is a schematic configuration diagram showing an example of an operation switch.

FIG. 2 is a schematic configuration diagram showing an example of the operation switch 7. The operation switch 7 is constructed by an operation knob 71 swingable in the a-b directions around axis Q as a center, a rod 72 provided integrally with the operation knob 71, and a known slide switch 73. Reference numeral 74 denotes an actuator of the slide switch 73, and 20 indicates a cover of a switch unit in which the operation switch 7 is assembled. The lower end of the rod 72 is engaged with the actuator 74 of the slide switch 73. When the operation knob 71 turns in the a-b direction, the actuator 74 moves in the c-d direction via the rod 72, and according to the movement position the contact (not shown) of the slide switch 73 is switched.

The operation knob 71 can be switched among the positions of an automatic closing mode AC, a manual closing mode MC, a neutral mode N, a manual opening mode MO, and an automatic opening mode AO. FIG. 2 shows a state where the operation knob 71 is in the position of the neutral mode N. When the operation knob 71 is turned by a certain amount in the direction "a" from the position of the neutral mode N to the position of the manual closing mode MC, the manual closing operation of closing the window in the manual mode is performed. When the operation knob 71 is further turned in the direction "a" from the position of the manual closing mode MC to the position of the automatic closing mode AC, the automatic closing operation of closing the window in the automatic mode is performed. When the operation knob 71 is turned by a certain amount from the position of the neutral mode N in the direction "b" to the position of the manual opening mode MO, the manual opening operation of opening the window in the manual mode is performed. When the operation knob 71 is further turned in the direction "b" from the position of the manual opening mode MO to the position of the automatic opening mode AO, the automatic opening operation of opening the window in the automatic mode is performed. The operation knob 71 is provided with a not-shown spring. When the user moves his/her hand off the turned operation knob 71, the operation knob 71 returns to the position of the neutral mode N by the spring force.

In the manual mode, only for the period of time the operation knob 71 is continuously held manually in the position of the manual closing mode MC or the manual opening mode MO, the window closing or opening operation is performed. When the user moves his/her hand off the operation knob 71 and the operation knob 71 returns to the position of the neutral mode N, the window closing or opening operation stops. On the other hand, in the automatic mode, once the operation knob 71 is operated to the position of the automatic closing mode AC or the automatic opening mode AO, even the user moves his/her hand off the operation knob 71 and the knob returns to the position of the neutral mode N, the window closing or opening operation is continuously performed.

Figure 3:
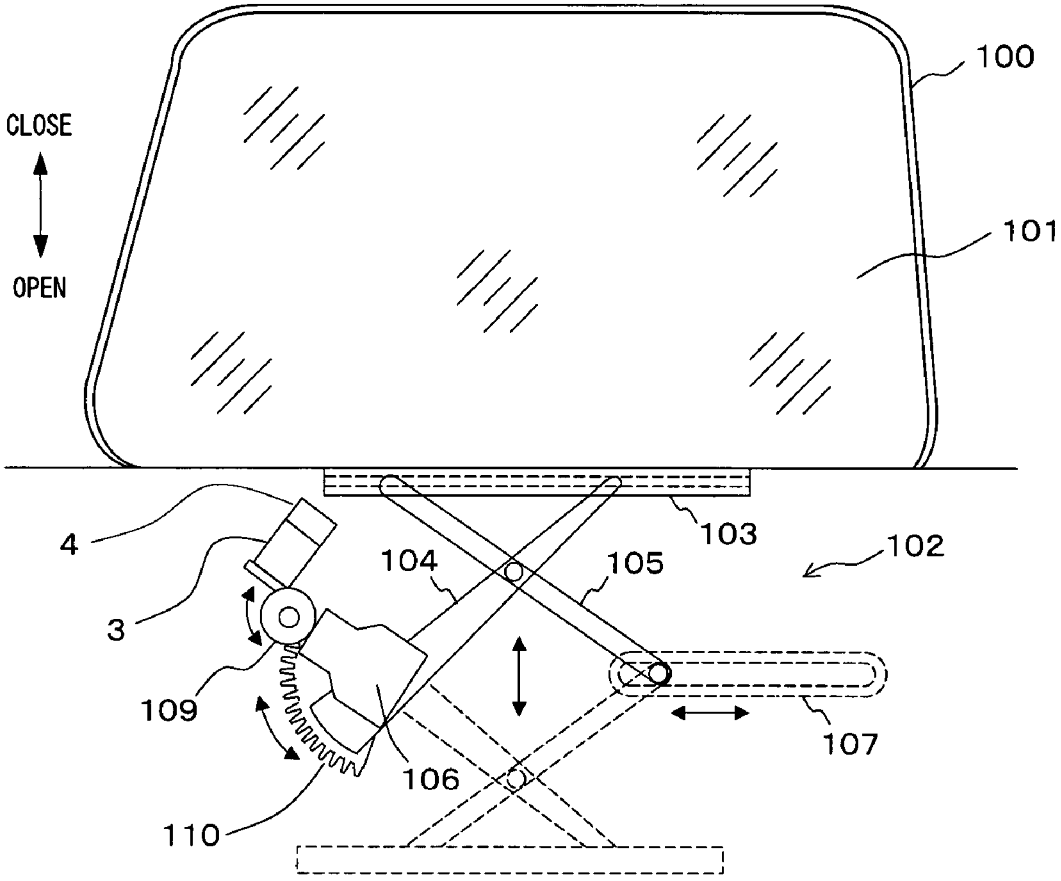
FIG. 3 is a diagram showing an example of a window opening/closing mechanism.

FIG. 3 is a diagram showing an example of a window opening/closing mechanism provided for each of the windows of a vehicle. Reference numeral 100 denotes a window of a vehicle, 101 denotes a window glass which opens/closes the window 100, and 102 indicates a window opening/closing mechanism. The window glass 101 performs ascending/descending operation by the operation of the window opening/closing mechanism 102. When the window glass 101 ascends, the window 100 is closed. When the window glass 101 descends, the window 100 is opened. The window glass 101 is an embodiment of the open/close member in the present invention. The window opening/closing mechanism 102 has a supporting member 103 attached to the lower end of the window glass 101, a first arm 104 whose one end is engaged with the supporting member 103 and whose other end is rotatably supported by a bracket 106, and a second arm 105 whose one end is engaged with the supporting member 103 and whose other end is engaged with a guide member 107. Intermediate parts in the first and second arms 104 and 105 are coupled to each other via a shaft. Reference numeral 3 denotes the above-described motor, and reference numeral 4 indicates the above-described rotary encoder. The rotary encoder 4 is coupled to the rotary shaft of the motor 3 and outputs pulses of the number proportional to the rotational amount of the motor 3. By counting the pulses output from the rotary encoder 4 within predetermined time, the rotation speed of the motor 3 can be detected. From the output of the rotary encoder 4, the rotation amount of the motor 3 (the movement amount of the window glass 101) can be calculated.

Reference numeral 109 denotes a pinion rotated by the motor 3, and reference numeral 110 denotes a fan-shaped gear engaged with the pinion 109 and rotating. The gear 110 is fixed to the first arm 104. The motor 3 can rotate in the forward and reverse directions. By the rotation in the forward and reverse directions, the pinion 109 and the gear 110 are rotated to turn the first arm 104 in the forward/reverse direction. Accompanying this operation, the other end of the second arm 105 slides in the lateral direction along a groove in the guide member 107, and the supporting member 103 moves in the vertical direction to make the window glass 101 ascend/descend, thereby opening/closing the window 100.

Figure 4:
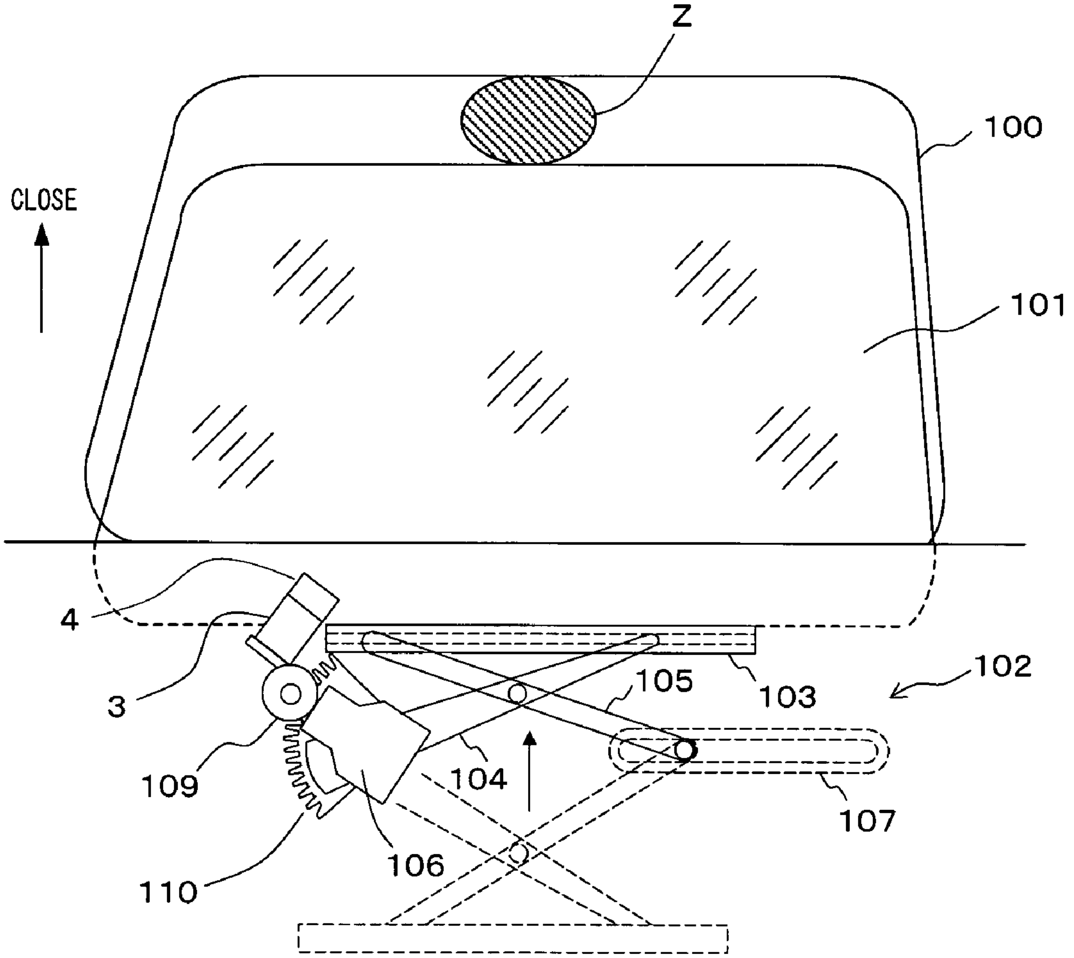
FIG. 4 is a diagram showing a state where an object is caught in a window.

In the power window apparatus as described above, when the operation knob 71 is in the position of the automatic closing mode AC in FIG. 2 and the automatic closing operation is performed, the function of detecting pinch of an object is provided. Specifically, as shown in FIG. 4, in the case where an object Z is caught in the clearance of the window glass 101 during closure of the window 100, the pinch is detected and the closing operation of the window 100 is switched to the opening operation. Since the window 100 is automatically closed during the automatic closing operation, to prevent the caught object Z from being damaged, the pinch detecting function acts and the closing operation of the window 100 is inhibited.

At the time of detecting pinch, the control unit 1 reads, as needed, the rotation speed of the motor 3 as an output of the pulse detection circuit 5, compares the rotation speed at present with the previous rotation speed and, on the basis of the comparison result, determines whether pinch has occurred or not. When the object Z is caught in the window 100 as shown in FIG. 4, the load on the motor 3 increases and the rotation speed decreases, so that the amount of change in the speed increases. When the speed change amount exceeds the threshold stored in the memory 6, it is determined that the object Z has been caught.

Figure 5:
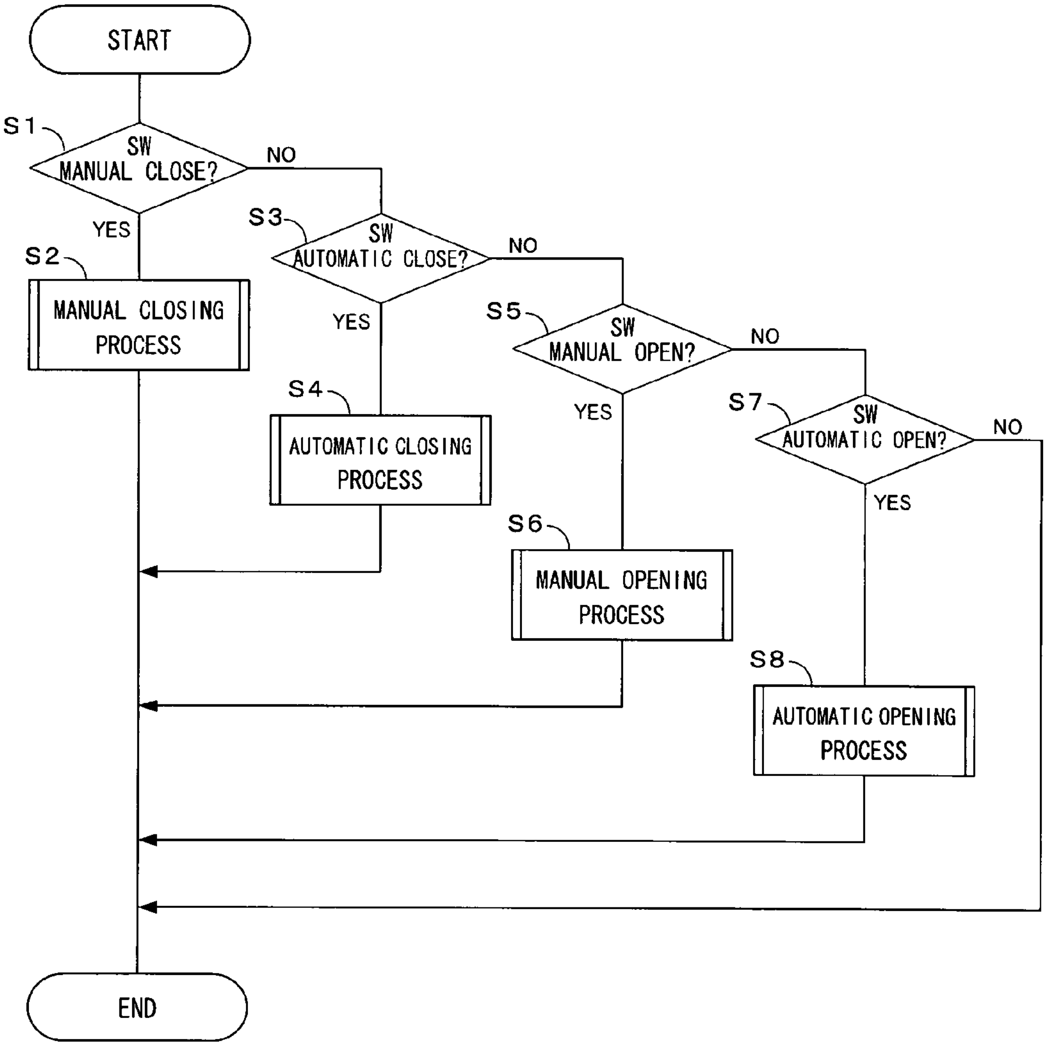
FIG. 5 is a flowchart showing basic operation of the power window apparatus.

FIG. 5 is a flowchart showing the basic operation of the power window apparatus of the embodiment of the present invention. "SW" in the diagram expresses the "operation switch 7" (also in the following flowcharts). In step S1, when the operation switch 7 is in the position of the manual closing mode MC, the process of the manual closing operation is performed (step S2). In step S3, when the operation switch 7 is in the position of the automatic closing mode AC, the automatic closing operation is performed (step S4). In step S5, when the operation switch 7 is in the position of the manual opening mode MO, the manual opening operation is performed (step S6). In step S7, when the operation switch 7 is in the position of the automatic opening mode AO, the automatic opening operation is performed (step S8). When the operation switch 7 is not in the position of the automatic opening mode AO in step S7, the operation switch 7 is in the position of the neutral mode N and no process is performed. The details of the steps S2, S4, S6, and S8 will be described in order hereinbelow.

Figure 6:
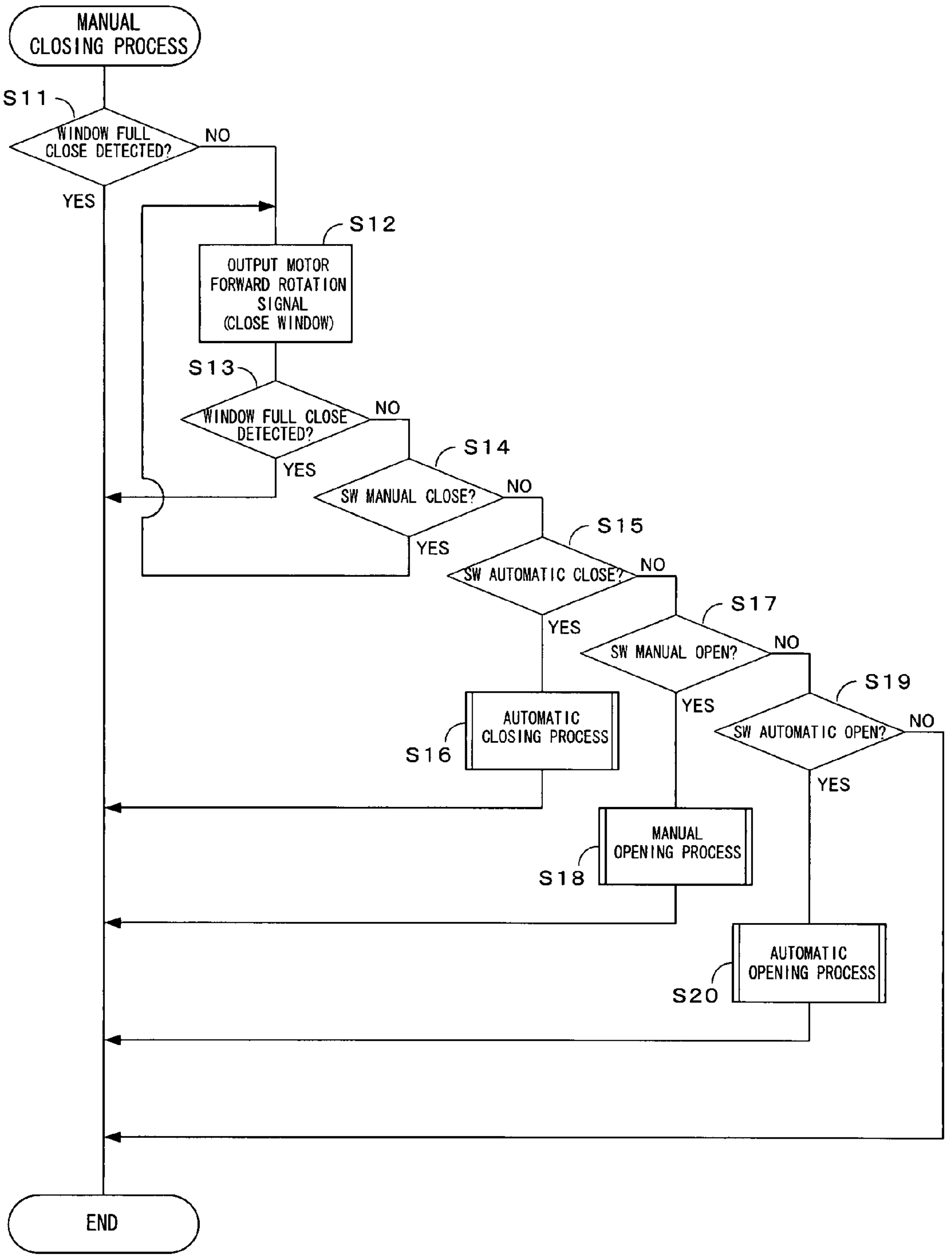
FIG. 6 is a flowchart showing detailed procedure of a manual closing process.

FIG. 6 shows detailed procedure of the "manual closing process" in step S2 in FIG. 5. The procedure is executed by the CPU constituting the control unit 1. First, whether the window 100 has been closed completely by the manual closing operation or not is determined on the basis of an output of the rotary encoder 4 (step S11). When the window 100 is closed completely (YES in step S11), the process is finished. When the window 100 is not closed completely (NO in step S11), a forward rotation signal is output from the motor drive circuit 2 to rotate the motor 3 forwardly and the window 100 is closed (step S12). Subsequently, whether the window 100 has been completely closed or not is determined (step S13). When the window 100 is closed completely (YES in step S13), the process is finished. When the window 100 is not closed completely (NO in step S13), whether the operation switch 7 is in the position of the manual closing mode MC or not is determined (step S14).

When the operation switch 7 is in the position of the manual closing mode MC (YES in step S14), the CPU returns to step S12 to continue the forward rotation of the motor 3. When the operation switch 7 is not in the position of the manual closing mode MC (NO in step S14), whether the operation switch 7 is in the position of the automatic closing mode AC or not is determined (step S15). When the operation switch 7 is in the position of the automatic closing mode AC (YES in step S15), the CPU moves to the automatic closing process to be described later (FIG. 7 or 8) (step S16). When the operation switch 7 is not in the position of the automatic closing mode AC (NO in step S15), whether the operation switch 7 is in the position of the manual opening mode MO or not is determined (step S17). When the operation switch 7 is in the position of the manual opening mode MO (YES in step S17), the CPU moves to the manual opening process to be described later (FIG. 9) (step S18). When the operation switch 7 is not in the position of the manual opening mode MO (NO in step S17), whether the operation switch 7 is in the position of the automatic opening mode AO or not is determined (step S19). When the operation switch 7 is in the position of the automatic opening mode AO (YES in step S19), the CPU moves to the automatic opening process to be described later (FIG. 10) (step S20). When the operation switch 7 is not in the position of the automatic opening mode AO (NO in step S19), the routine is finished without performing any process.

Figure 7:
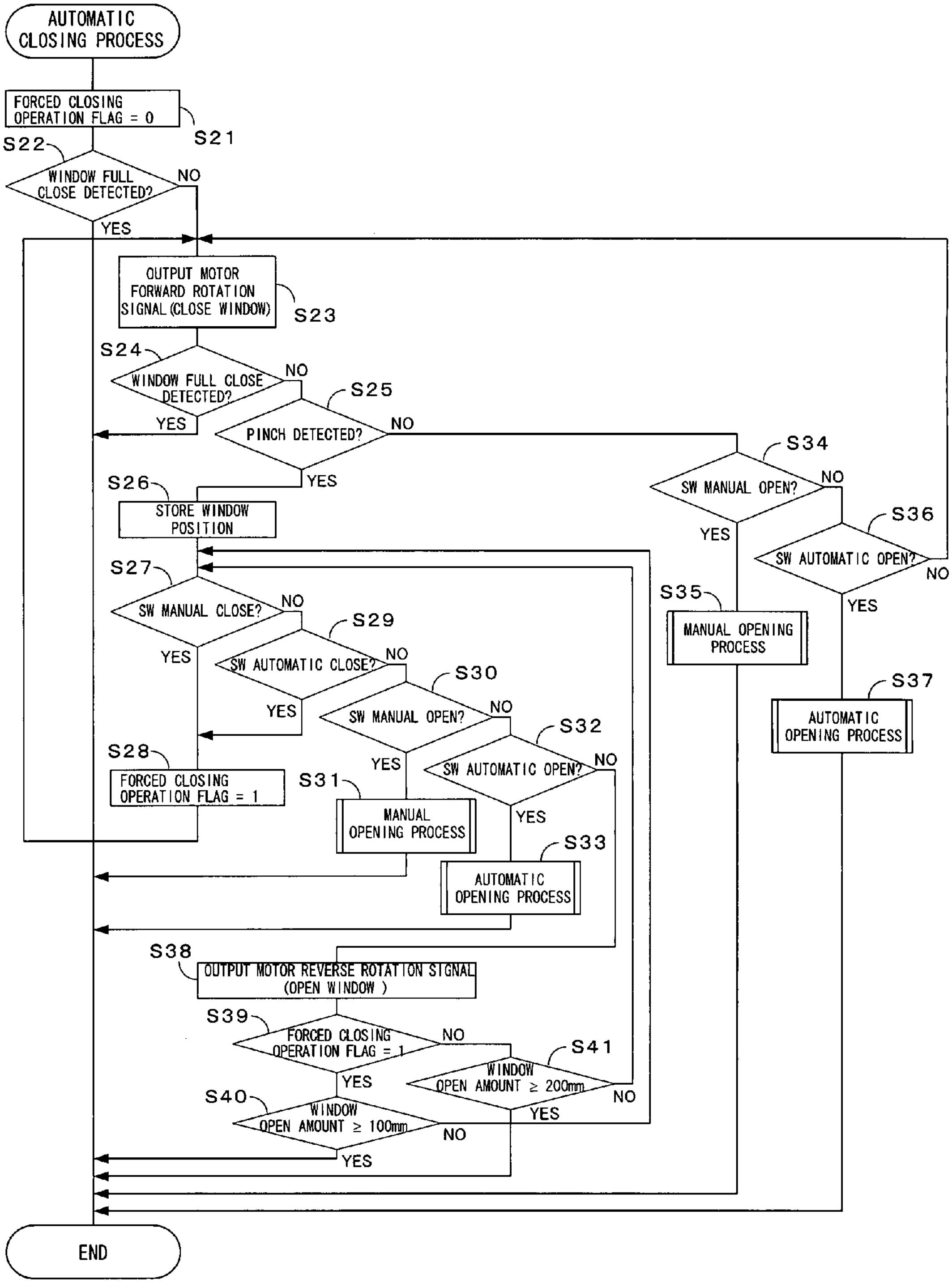
FIG. 7 is a flowchart showing detailed procedure of an automatic closing process.

FIG. 7 shows detailed procedure of the "automatic closing process" in step S4 in FIG. 4, which is the feature of the present invention. The procedure is executed by the CPU constituting the control unit 1. First, the forced closing operation flag in the area 6*b* in the memory 6 is set to "0" (step S21). The forced closing operation flag is a flag showing whether the forced closing operation by the operation switch 7 has been performed or not. The forced closing operation is an operation performed in such a manner that after the operation switch 7 is operated to start the automatic closing operation, the operation switch 7 is operated again to the "close" side (the automatic closing mode AC or the manual closing mode MC) to forcedly close the window without opening the window even if pinch occurs. When the forced closing operation is performed, the forced closing operation flag is set to "1". When the forced closing operation is not performed, the forced closing operation flag is set to "0".

Next, whether the window 100 is completely closed by the automatic closing operation or not is determined on the basis of an output of the rotary encoder 4 (step S22). When the window 100 is completely closed (YES in step S22), the process is finished. When the window 100 is not completely closed (NO in step S22), the routine moves to step S23.

In step S23, a forward rotation signal is output to the motor drive circuit 2 to rotate the motor 3 forward, thereby closing the window 100. Subsequently, whether the window 100 is completely closed or not is determined (step S24). When the window 100 is completely closed (YES in step S24), the process is finished. When the window 100 is not completely closed (NO in step S24), the routine moves to step S25 where whether pinch is detected or not is determined. The pinch detection is, as described above, performed by comparing the speed change amount of the motor 3 with a threshold stored in the area 6*a* in the memory 6. When the speed change amount exceeds the threshold, it is determined that the object Z is caught as shown in FIG. 4.

When pinch is not detected (NO in step S25), whether the operation switch 7 is in the position of the manual opening mode MO or not is determined (step S34). When the operation switch 7 is in the position of the manual opening mode MO (YES in step S34), the routine moves to the manual opening process (FIG. 9) to be described later (step S35). When the operation switch 7 is not in the position of the manual opening mode MO (NO in step S34), whether the operation switch 7 is in the position of the automatic opening mode AO or not is determined (step S36). When the operation switch 7 is in the position of the automatic opening mode AO (YES in step S36), the routine moves to the automatic opening process (FIG. 10) to be described later (step S37). When the operation switch 7 is not in the position of the automatic opening mode AO (NO in step S36), the routine returns to step S23, continues the automatic closing operation, and closes the window 100.

On the other hand, when pinch is detected (YES in step S25), the position of the window glass 101 at that time is stored in the memory 6 (step S26). The position can be detected by counting the number of pulses output from the rotary encoder 4. After that, the routine moves to step S27 where the operation switch 7 is in the position of the manual closing mode MC or not is determined. When the operation switch 7 is not in the position of the manual closing mode MC (NO in step S27), whether the operation switch 7 is in the position of the automatic closing mode AC or not is determined (step S29). In the case where the operation switch 7 is not in the position of the automatic closing mode AC (NO in step S29), whether the operation switch 7 is in the position of the manual opening mode MO or not is determined (step S30). If it is not in the position of the manual opening mode MO (NO in step S30), whether the operation switch 7 is in the position of the automatic opening mode AO or not is determined (step S32). In the case where pinch is detected, if the operation switch 7 is not operated, it is determined as NO in all of steps S27, S29, S30 and S32, then the routine moves to step S38.

Figure 11A:
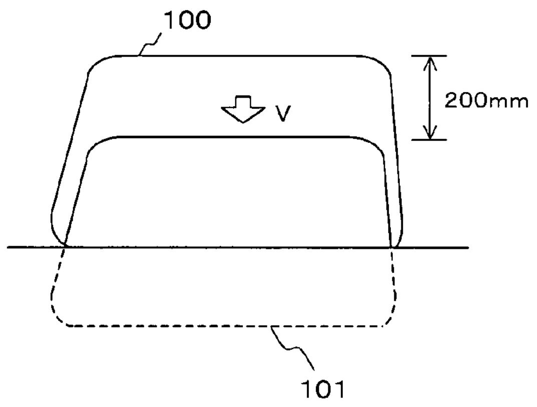
FIGS. 11A and 11B are diagrams showing a window opening amount.

In step S38, a reverse rotation signal is output from the motor drive circuit 2 to reversely rotate the motor 3, thereby switching the window operation from the closing operation to the opening operation. Subsequently, whether the forced closing operation flag is "1" or not is determined (step S39). In this stage, the forced closing operation is not performed and the forced closing operation flag is "0" (NO in step S39). Consequently, the routine advances to step S41 and whether or not the window is opened by 200 mm or more is determined as shown in FIG. 11A. V expresses window opening speed. Above-mentioned 200 mm is a reference value in the normal case where the forced closing operation is not performed. The window opening amount can be calculated by using the window position stored in step S26. When the window is not open by 200 mm or more (NO in step S41), the routine returns to step S27. The steps S27, S29, S30, S32, S38, S39 and S41 are repeated, and the window opening operation is continued. When the window opens by 200 mm or more as shown in FIG. 11A (YES in step S41), the motor 3 is stopped and the operation is finished. The normal window reversing operation performed at the time of occurrence of pinch has been described above.

On the other hand, in the case where pinch is detected and the operation switch 7 is in the forced closing operation state, that is, in the case where the switch 7 is operated in the position of the manual closing mode MC (YES in step S27) or operated in the position of the automatic closing mode AC (YES in step S29), the routine advances to step S28 where the forced closing operation flag in the area 6*b* in the memory 6 is rewritten to "1". The routine then moves to step S23 where a forward rotation signal is output from the motor drive circuit 2 to forwardly rotate the motor 3, thereby closing the window 100. While the switch 7 is maintained in the forced closing operation state, it is determined as YES in step S27 or S29, and the window closing operation continues. Even if pinch occurs, the window 100 is not opened (steps S23 to S29).

Figure 9:
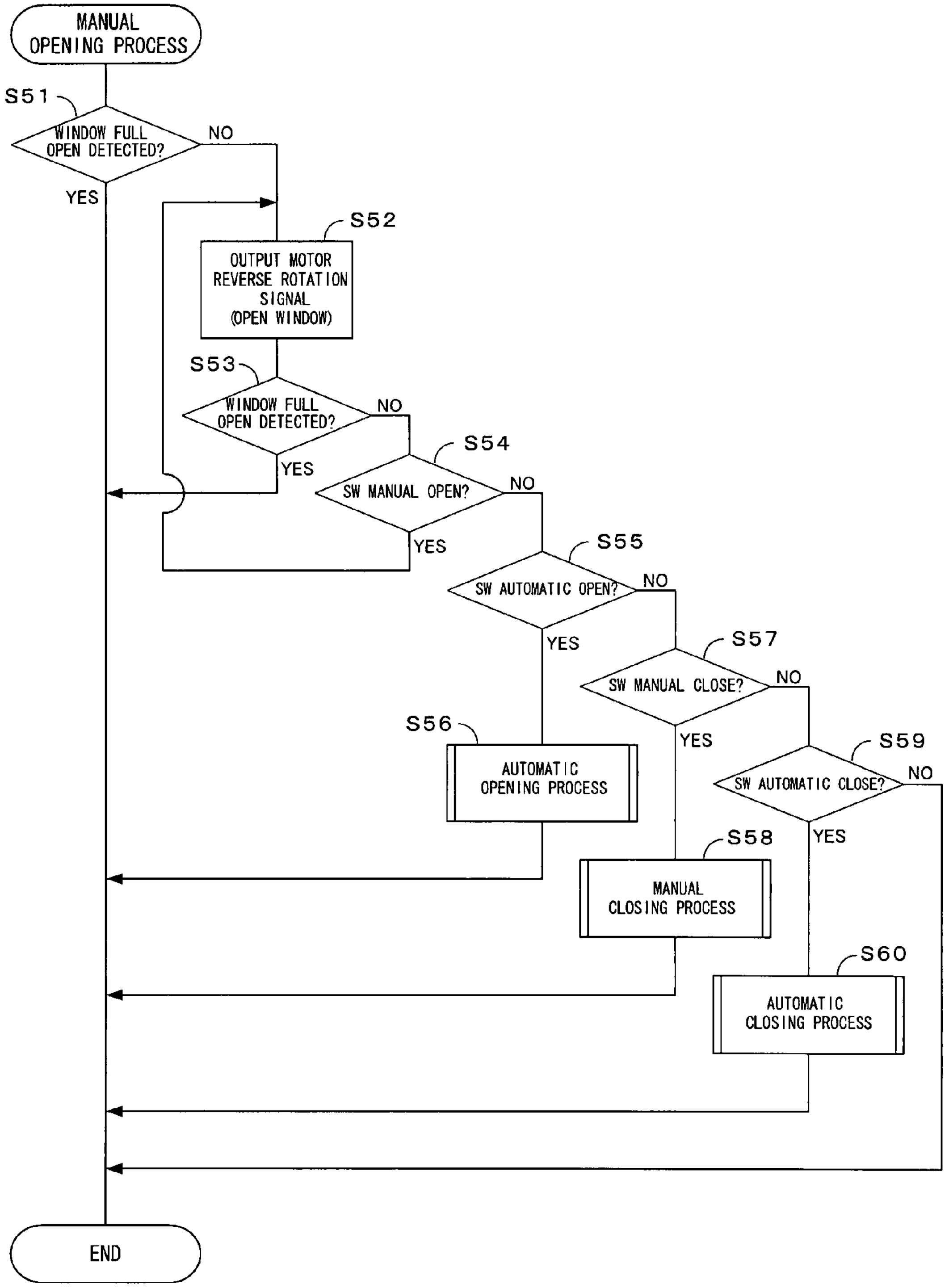
FIG. 9 is a flowchart showing detailed procedure of a manual opening process.

In the case where the operation switch 7 is operated in the position of the manual opening mode MO in step S30 (YES in step S30), the routine shifts to the manual opening process (step S31) to be described later (FIG. 9). In the case where the operation switch 7 is operated in the position of the automatic opening mode AO in step S32 (YES in step S32), the routine shifts to the automatic opening process (FIG. 10) to be described later (step S33).

Figure 11B:
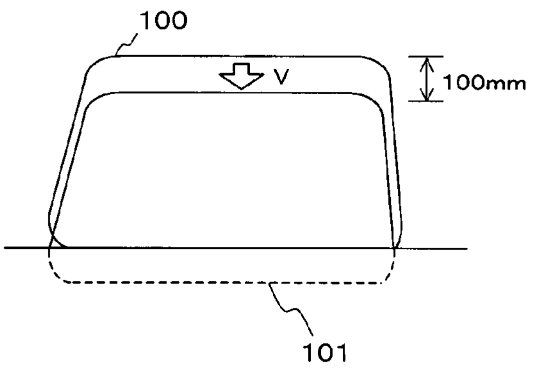

When the user's hand moves off the operation switch 7 and the operation knob 71 returns to the position of the neutral mode N from the position of the automatic closing mode AC or manual closing mode MC in a state where the forced closing operation of the operation switch 7 continues, it is determined as NO in all of the steps S27, S29, S30 and S32, so that the routine moves to step S38. In step S38, as described above, a reverse rotation signal is output from the motor drive circuit 2 to reversely rotate the motor 3, and the window operation is switched from the closing operation to the opening operation. Subsequently, whether the forced closing operation flag is "1" or not is determined (step S39). In this stage, since the forced closing operation has been already performed and the forced closing operation flag has been set to "1" in step S28 (YES in step S39), the routine advances to step S40 and whether or not the window is opened by 100 mm or more is determined as shown in FIG. 11B. V denotes the window opening speed which is the same value as that in the case of FIG. 11A. Above-mentioned 100 mm is a reference value in the forced closing operation performed in such a case that a ruffian is assaulting the user. The window opening amount can be calculated by using the window position stored in step S26. When the window is not open by 100 mm or more (NO in step S40), the routine returns to step S27. Steps S27, S29, S30, S32, and S38 to S40 are repeated, and the window opening operation is continued. When the window opens by 100 mm or more as shown in FIG. 11B (YES in step S40), the motor 3 is stopped and the operation is finished.

As described above, in the embodiment of FIG. 7, even when the user moves his/her hand off the switch 7 during the closing operation of window 100 by the forced closing operation of the operation switch 7, continuation of the forced closing operation is cancelled, and the window 100 opens due to pinch detection, the opening amount of the window 100 (the movement amount of the window glass 101) is smaller (100 mm) than that in normal times as shown in FIG. 11B. Consequently, entrance of a ruffian from the window 100 is suppressed, and a person in the vehicle can be prevented from being harmed. In the case where an object is caught by mistake, the window glass 101 opens without being stopped. Therefore, the pinch load decreases, and the caught object can be prevented from being damaged.

Figure 8:
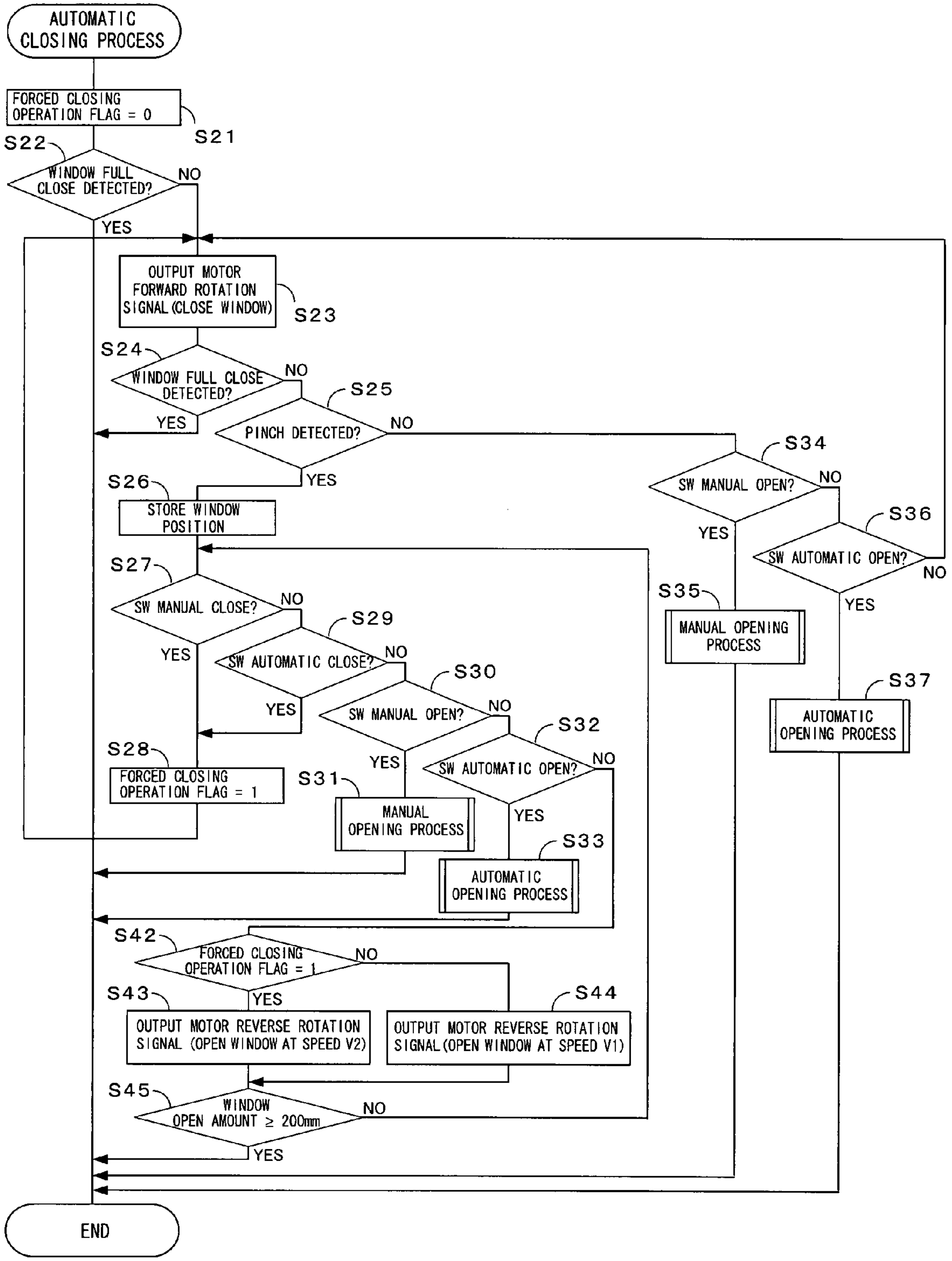
FIG. 8 is a flowchart showing detailed procedure of the automatic closing process in another embodiment.

FIG. 8 is a flowchart showing another embodiment of the automatic closing process. The procedure is executed by the CPU constituting the control unit 1. In FIG. 8, the same reference numerals are designated to steps of performing the same processes as those of FIG. 7. In FIG. 7, when the forced closing operation is cancelled, the window open amount is regulated. In FIG. 8, when the forced closing operation is cancelled, the window open speed is regulated.

Among the steps in FIG. 8, the steps S21 to S37 are the same as those of FIG. 7, so that they will be briefly described. First, the forced closing operation flag is set to "0" (step S21), and the window closing operation is performed by the automatic closing operation (steps S22 to S24). In the case where pinch is not detected during the closing operation (NO in step S25) and the opening operation is not performed (NO in step S34 and NO in step S36), the automatic closing operation is continued. In the case where the manual opening operation or automatic opening operation is performed, the routine shifts to the manual opening process or the automatic opening process (step S35 or S37). When pinch is detected (YES in step S25), the window position is stored (step S26) and, after that, whether the operation switch 7 is operated or not is determined (steps S27, S29, S30 and S32). When the operation switch 7 is not operated, it is determined as NO in all of steps S27, S29, S30 and S32, and the routine shifts to step S42.

Figure 12A:
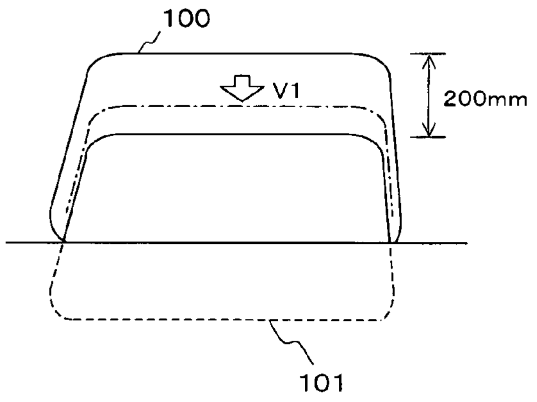
FIGS. 12A and 12B are diagrams showing window opening speed.

In step S42, whether the forced closing operation flag is "1" or not is determined. In this stage, the forced closing operation is not performed and the forced closing operation flag is "0" (NO in step S42), so that the routine shifts to step S44. In step S44, a reverse rotation signal is output from the motor drive circuit 2 to rotate the motor 3 reversely, thereby switching the window operation from the closing operation to the opening operation. At this time, the window opens at speed V1 as shown in FIG. 12A. Specifically, an instruction of supplying drive voltage to open the window at the speed V1 to the motor 3 is given from the control unit 1 to the motor drive circuit 2. V1 is a reference value in the normal case where the forced closing operation is not performed. After that, the routine advances to step S45 and whether or not the window opens by 200 mm or more is determined. The window open amount can be calculated by using the window position stored in step S26. In the case where the window is not open by 200 mm or more (NO in step S45), the routine returns to step S27. The steps S27, S29, S30, S32, S42, S44 and S45 are repeated, and the window opening operation is continued. When the window opens by 200 mm or more as shown in FIG. 12A (YES in step S45), the motor 3 is stopped and the operation is finished. The normal window reversing operation performed at the time of occurrence of pinch has been described above.

On the other hand, in the case where pinch is detected and the operation switch 7 is in the forced closing operation state (YES in step S27 and YES in step S29), the forced closing operation flag is rewritten to "1" (step S28), and the motor 3 is rotated forwardly to close the window 100 (step S23). While the forced closing operation is maintained, the window closing operation is continued and, even if pinch occurs, the window 100 is not opened (steps S23 to S29). In the case where the manual opening operation or the automatic opening operation is performed, the routine shifts to the manual opening process or the automatic opening process (steps S31, S33).

Figure 12B:
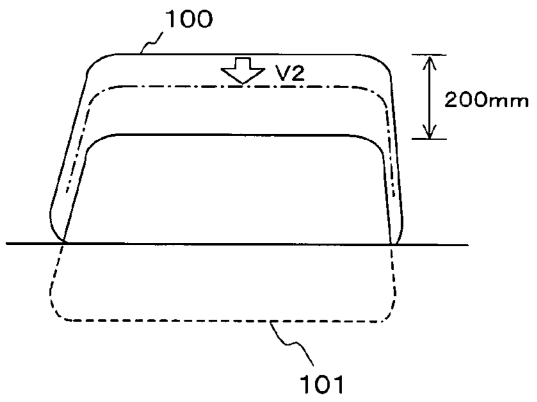

When the user moves his/her hand off the operation switch 7 and the operation knob 71 returns to the position of the neutral mode N from the automatic closing mode AC or the manual closing mode MC in a state where the forced closing operation of the operation switch 7 is maintained, it is determined as NO in all of the steps S27, S29, S30 and S32, so that the routine shifts to step S42. In step S42, as described above, whether the forced closing operation flag is "1" or not is determined. In this stage, since the forced closing operation is performed and the forced closing operation flag is set to "1" in step S28 (YES in step S42), the routine shifts to step S43. In step S43, a reverse rotation signal is output from the motor drive circuit 2 to rotate the motor 3 reversely to switch the window operation from the closing operation to the opening operation. At this time, the window opens at the speed V2 as shown in FIG. 12B. Specifically, an instruction of supplying drive voltage to open the window at the speed V2 to the motor 3 is given from the control unit 1 to the motor drive circuit 2. V2 is a reference value in the forced closing operation performed in such a case that a ruffian is assaulting the user, and is smaller than the reference value V1 in the case where no forced closing operation is performed (V2<V1). Therefore, in step S43, the window 100 opens at speed lower than that in the case of step S44. After that, the routine advances to step S45 and whether or not the window opens by 200 mm or more is determined. The window open amount can be calculated by using the window position stored in the step S26. In the case where the window does not open by 200 mm or more (NO in step S45), the routine returns to step S27. The steps S27, S29, S30, S32, S42, S43 and S45 are repeated, and the window opening operation is continued. When the window opens by 200 mm or more as shown in FIG. 12B (YES in step S45), the motor 3 is stopped to finish the operation.

As described above, in the embodiment of FIG. 8, even when the user moves his/her hand off the switch 7 during the closing operation of the window 100 by the forced closing operation of the operation switch 7, continuation of the forced closing operation is cancelled, and the window 100 opens due to pinch detection, the opening speed of the window 100 (travel speed of the window glass 101) is lower (V2) than that in normal times as shown in FIG. 12B. Consequently, entrance of a ruffian from the window 100 is suppressed, and a person in the vehicle can be prevented from being harmed. In the case where an object is caught by mistake, the window glass 101 opens without being stopped. Therefore, the pinch load decreases, and the caught object can be prevented from being damaged.

FIG. 9 shows detailed procedure of the "manual opening process" in step S6 in FIG. 5. The procedure is executed by the CPU constituting the control unit 1. First, whether the window 100 has been completely opened by the manual opening operation or not is determined on the basis of an output of the rotary encoder 4 (step S51). When the window 100 is opened completely (YES in step S51), the process is finished. When the window 100 is not opened completely (NO in step S51), a reverse rotation signal is output from the motor drive circuit 2 to reversely rotate the motor 3 and the window 100 is opened (step S52). Subsequently, whether the window 100 is completely opened or not is determined (step S53). When the window 100 is opened completely (YES in step S53), the process is finished. When the window 100 is not opened completely (NO in step S53), whether the operation switch 7 is in the position of the manual opening mode MO or not is determined (step S54).

Figure 10:
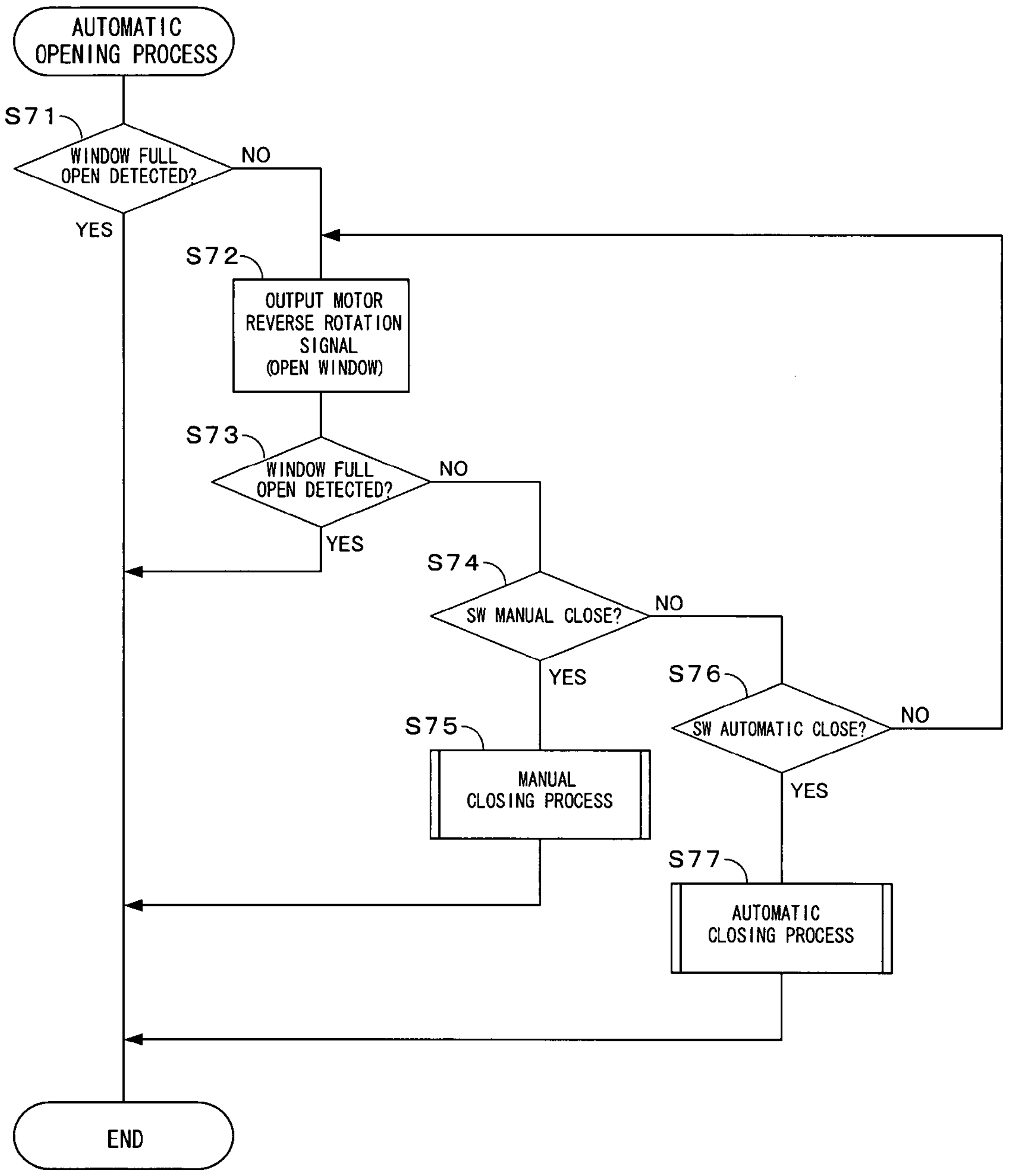
FIG. 10 is a flowchart showing detailed procedure of an automatic opening process.

When the operation switch 7 is in the position of the manual opening mode MO (YES in step S54), the routine returns to step S52 to continue the reverse rotation of the motor 3. When the operation switch 7 is not in the position of the manual opening mode MO (NO in step S54), whether the operation switch 7 is in the position of the automatic opening mode AO or not is determined (step S55). When the operation switch 7 is in the position of the automatic opening mode AO (YES in step S55), the routine moves to the automatic opening process (step S56) to be described later (FIG. 10). When the operation switch 7 is not in the position of the automatic opening mode AO (NO in step S55), whether the operation switch 7 is in the position of the manual closing mode MC or not is determined (step S57). When the operation switch 7 is in the position of the manual closing mode MC (YES in step S57), the routine moves to the manual closing process described before (FIG. 6) (step S58). When the operation switch 7 is not in the position of the manual closing mode MC (NO in step S57), whether the operation switch 7 is in the position of the automatic closing mode AC or not is determined (step S59). When the operation switch 7 is in the position of the automatic closing mode AC (YES in step S59), the routine moves to the automatic closing process described before (FIG. 7 or 8) (step S60). When the operation switch 7 is not in the position of the automatic closing mode AC (NO in step S59), the routine is finished without performing any process.

FIG. 10 shows detailed procedure of the "automatic opening process" in step S8 in FIG. 5. The procedure is executed by the CPU constituting the control unit 1. First, whether the window 100 is completely opened by the automatic opening operation or not is determined on the basis of an output of the rotary encoder 4 (step S71). When the window 100 is completely opened (YES in step S71), the process is finished. When the window 100 is not completely opened (NO in step S71), a reverse rotation signal is output from the motor drive circuit 2 to reversely rotate the motor 3, thereby opening the window 100 (step S72). Subsequently, whether the window 100 is completely opened or not is determined (step S73). When the window 100 is completely opened (YES in step S73), the process is finished. When the window 100 is not completely opened (NO in step S73), whether the operation switch 7 is in the position of the manual closing mode MC or not is determined (step S74).

When the operation switch 7 is in the position of the manual closing mode MC (YES in step S74), the routine moves to the manual closing process described before (FIG. 6) (step S75). When the operation switch 7 is not in the position of the manual closing mode MC (NO in step S74), whether the operation switch 7 is in the position of the automatic closing mode AC or not is determined (step S76). When the operation switch 7 is in the position of the automatic closing mode AC (YES in step S76), the routine moves to the automatic closing process described before (FIG. 7 or 8) (step S77). When the operation switch 7 is not in the position of the automatic closing mode AC (NO in step S76), the routine returns to step S72 and continues the reverse rotation of the motor 3.

The present invention can employ not only the foregoing embodiment but also various embodiments. For example, the values of 100 mm in step S40 in FIG. 7 and 200 mm in step S41 in FIG. 7 and step S45 in FIG. 8 are an example. Obviously, values other than the above values may be employed as reference values.

In the foregoing embodiment, when pinch is detected, if the operation switch 7 is maintained in either the automatic closing mode or the manual closing mode, the window is forcedly closed. Alternatively, when pinch is detected, only in the case where the operation switch 7 is maintained in the automatic closing mode or only in the case where the operation switch 7 is maintained in the manual closing mode, the window may be forcedly closed.

In the foregoing embodiment, in the case where the window opening amount in the normal times and that in the forced closing operation are made different from each other as shown in FIGS. 11A and 11B, the same window opening speed V is employed. In the case where the window opening speed V1 in the normal times and the window opening speed V2 at the time of forced closing operation are made different from each other as shown in FIGS. 12A and 12B, the same window opening amount is employed. As a combination, both of the window opening amounts are made different from each other and the window opening speeds are made different from each other in normal times and in the forced closing operation.

Although the load on the motor is detected on the basis of the rotation speed of the motor 3 in the foregoing embodiment, instead, the load on the motor may be detected on the basis of the current flowing in the motor 3. In this case, as a load detector, it is sufficient to provide a current detection circuit for detecting motor current.

Further, although a window glass of a vehicle has been described as an open/close member in the foregoing embodiment, the invention can be also applied to the case of controlling an open/close member such as a rear door or a sunroof of a vehicle. The invention can be also applied to the case of controlling opening/closing of a door in a building.

What is claimed is:

1. An open/close member control apparatus comprising:

a switch for opening/closing an open/close member;

a load detector that detects load on the open/close member; and a pinch detector for detecting pinch of a foreign matter in the open/close member on the basis of the load detected by the load detector, the apparatus having a function of forcedly making the open/close member perform closing operation even if pinch is detected by performing a predetermined forced closing operation on the switch, and switching the closing operation of the open/close member to opening operation in the case where the pinch detector detects pinch and the forced closing operation on the switch is not maintained, and continuing the closing operation of the open/close member in the case where the pinch detector detects pinch and the forced closing operation on the switch is maintained, wherein in the case where the pinch detector detects pinch and the forced closing operation of the switch is maintained, when the maintenance of the forced closing operation is cancelled during closing operation of the open/close member, the open/close member is allowed to perform opening operation so that an open amount of the open/close member becomes smaller than that in normal times.

2. An open/close member control apparatus comprising:

a switch for opening/closing an open/close member;

a load detector that detects load on the open/close member; and a pinch detector for detecting pinch of a foreign matter in the open/close member on the basis of the load detected by the load detector, the apparatus having a function of forcedly making the open/close member perform closing operation even if pinch is detected by performing a predetermined forced closing operation on the switch, and switching the closing operation of the open/close member to opening operation in the case where the pinch detector detects pinch and the forced closing operation on the switch is not maintained, and continuing the closing operation of the open/close member in the case where the pinch detector detects pinch and the forced closing operation on the switch is maintained, wherein in the case where the pinch detector detects pinch and the forced closing operation of the switch is maintained, when the maintenance of the forced closing operation is cancelled during closing operation of the open/close member, the open/close member is allowed to perform opening operation so that open speed of the open/close member becomes lower than that in normal times.

* * * * *

UNITED STATES PATENT AND TRADEMARK OFFICE

CERTIFICATE OF CORRECTION

PATENT NO. : 7,619,381 B2
APPLICATION NO. : 11/882334
DATED : November 17, 2009
INVENTOR(S) : Nobuyuki Kawai et al.

It is certified that error appears in the above-identified patent and that said Letters Patent is hereby corrected as shown below:

On the Title Page Please correct the Assignee Name as follows:

Item (73) Assignees: "Omiron Corporation" should read -- Omron Corporation --.

Signed and Sealed this

Twentieth Day of April, 2010

David J. Kappos
*Director of the United States Patent and Trademark Office*